Patented June 18, 1940

2,204,933

UNITED STATES PATENT OFFICE 2,204,933

PROCESS FOR PRODUCING DYEINGS

Charles Graenacher, Riehen, Switzerland, assignor to Society of Chemical Industry in Basle, Basel, Switzerland No Drawing. Original application July 5, 1938, Serial No. 217,633. Divided and this application March 14, 1939, Serial No. 261,842. In Switzerland July 10, 1937

6 Claims. (Cl. 8—49)

This application is a division of Patent Serial No. 217,633, filed in U. S. A. on July 5, 1938, and in Switzerland on July 10, 1937.

In U. S. Patents Nos. 2,095,600 and 2,120,741 and in the U. S. patent applications Serial No. 92,244, filed July 23, 1936, and Serial No. 173,528, filed November 8, 1937, there are described water soluble acyl derivatives of sparingly soluble dyestuffs which contain in the acyl residue groups determining water-solubility. In the said specification it is explained how such derivatives may be used for producing dyeings by treating them on the substratum, for instance vegetable fiber, with a saponifying agent.

It has now been found that quite generally a certain difficulty consists therein that such easily soluble acyl derivatives can be more or less dissolved from the fiber during the saponification. This is particularly the case if the affinity of the new ester-like derivatives for the substrata is not very pronounced. Whereas this affinity is rather pronounced in certain substrata such as textiles of animal origin, for example wool or silk, it is smaller with substrata of vegetable origin, for example textiles from cellulose (this term comprising both regenerated and native cellulose). In such cases it is necessary to conduct the treatment with the saponifying agents under more energetic conditions with regard to the hydroxyl ion concentration of the saponifying liquid. Thus it is avoided that, preceding the saponification, the water-soluble salts of the ester-like products are dissolved in part from the fibre by the treating liquor. Apart from the fact that such a method of working does not always lead to quite satisfactory results, there is a disadvantage if the substratum or the final dyestuff is sensitive to caustic alkali.

It has now been found that by the selection of suitable conditions it is possible to reduce the dissolution of the water-soluble acyl derivatives from the substratum previously to their saponification to a minimum, so that with regard to the duration of the saponification and the hydroxyl ion concentration of the saponifying liquid one is in a position to select for the saponification the most favorable conditions with respect to the substratum, sensitiveness to alkali of the dyestuffs, and the apparatuses. These conditions exist for example when carrying out the operation in the presence of water-soluble salts which reduce the solubility of the ester-like products on the fiber, either by applying them in greater quantities or by converting the ester-like product into sparingly soluble salts by double reaction.

In the former case, which is the subject matter of the parent application Serial No. 217,633, filed July 5, 1938, there may be used salts such as sodium chloride or sodium sulfate, ammonium chloride, potassium chloride, potassium sulfate, ammonium sulfate or magnesium chloride (the latter preferably in the presence of ammonium salts such as ammonium chloride). Such salts may simultaneously also be used as saponifying agents, this is the case if salts having an alkaline reaction are used, such as for example alkali phosphates or alkali carbonates.

In the latter case which is the subject matter of the present application, it is advantageous to use barium chloride, calcium chloride, barium nitrate, zinc chloride, aluminium sulfate and the like. Working may also be effected in such a manner that the use of a bath in the treatment with the saponifying agents is avoided. This may be brought about for example by a treatment with basic vapors such as ammonia gas or organic amines in the form of vapor. This manner of working is the subject matter of my copending application Serial No. 261,841, filed March 14, 1939. The examples of the parent application Serial No. 217,633 and of the copending application Serial No. 261,841 are also to be taken into consideration when judging the scope of the disclosure of the present application.

When carrying out the operation in aqueous baths there are preferably used such hydroxyl ion concentrations which correspond to N/10 up to almost N-solutions of hydroxides of the alkali metals. Preferably N/10 to N/15 solutions are used. If desired, there may of course also be used higher concentrations of caustic alkalies.

The treating liquors may contain further additions, determined by the nature of the fabric, by any accompanying dyestuffs which may be fixed on the fibre by some other method or by other reasons. Such additional substances are wetting agents, agents promoting penetration, thickening agents, oxidizing agents or the like.

The process of the invention is not only applicable to the products of the aforesaid U. S. patent specifications. It may be used quite generally for water-soluble acyl derivatives of sparingly soluble dyestuffs which contain in the acyl residue a group determining solubility in water (for instance, the products of the U. S. patent application Serial No. 173,528, filed November 8, 1937). It is suitable both for dyeing in the narrower sense and for printing.

The following examples illustrate the invention:

Example 1

The following printing paste is prepared:

| | Grams |
|---|---|
| The product of the action of meta-benzoic acid sulfo-chloride on the azo-dyestuff from diazotized 4-(4'-methyl)-phenoxy-acetylamino-2:5-dimethoxy-1-aminobenzene and the 3-nitranilide of 2:3-hydroxynaphthoic acid | 60 |
| Water | 140 |
| Thiodiglycol | 150 |
| Urea | 100 |
| Neutral starch tragacanth thickening | 500 |
| Trisodium phosphate solution 1:4 | 50 |
| | 1000 |

This paste is printed on a fabric which may consist of viscose satin or of cotton or a mixture of cotton and artificial silk from regenerated cellulose, which is then dried and treated in the Mather-Platt apparatus for 5–10 minutes. The print is then treated in the reeling vat for 5 minutes at 25° C. with an aqueous solution containing per litre 10 grams of crystallized barium chloride and 10 grams of sodium hydroxide. The print is then rinsed as described above, soured and soaped. There is obtained an intense fast violet print on the artificial silk.

The procedure is similar with other fibers such as silk or wool or with mixtures of such fibers with those of the preceding paragraph.

If necessary the barium chloride may be replaced by calcium chloride, strontium nitrate or magnesium chloride (in the presence of ammonium chloride). The sodium hydroxide may also be replaced by potassium hydroxide and, if desired, there may be used greater quantities of caustic alkalies.

Example 2

The following two printing pastes are prepared:

(a)

| | Grams |
|---|---|
| The product of the action of meta-benzoic acid sulfochloride on the azo-dyestuff from diazotized 3-chloraniline and the anilide of 2:3-hydroxynaphthoic acid | 80 |
| Water | 270 |
| Urea | 50 |
| Resorcinol | 50 |
| Neutral starch tragacanth thickening | 550 |
| | 1000 |

(b)

| | Grams |
|---|---|
| A paste of 20 per cent strength of tetrabromindigo | 150 |
| Potash thickening | 650 |
| Sodium sulfoxylate formaldehyde | 80 |
| Urea | 80 |
| Water | 40 |
| | 1000 |

The potash thickening is made as follows:

| | Grams |
|---|---|
| Wheat starch | 110 |
| Water | 170 |
| Tragacanth thickening (60/1000) | 250 |
| British gum | 200 |
| Potassium carbonate | 170 |
| Glycerine | 100 |
| | 1000 |

The two colors are printed simultaneously in a two-roller machine on cotton; the print is dried and treated for 5–10 minutes in the Mather-Platt apparatus and then in a reeling vat for 5 minutes at 25° C. with an aqueous solution containing per litre 7 grams of sodium hydroxide and 2 grams of sodium bichromate in addition to 200 or 300 grams of sodium chloride or potassium chloride or 10 to 20 grams of crystallized barium chloride. Instead of 7 grams of sodium hydroxide there may also be used 50 to 100 cc. of concentrated ammonia solution.

The cotton is then rinsed as described above, soured and soaped; there is obtained a fast brilliant orange and blue two-color print.

Example 3

10 parts by weight of bleached cellulose are ground with 500 parts of water. To the mass thus produced there is added, dissolved in 50 parts of hot water, 0.8 part of the product of the action of sulfobenzoyl chloride on the azo-dyestuff from diazotized 4:4'-di-chloro-2-aminodiphenyl ether and the ortho-anisidide of 2:3-hydroxy-naphthoic acid, and the whole is thoroughly mixed. There is then added 0.5 part by volume of a sodium hydroxide solution of 36° Bé. which has been previously diluted with 5 parts of water, the whole is mixed again and 30 parts of a barium chloride solution of 20 per cent strength are added. After mixing the product is sized by the addition of 3 parts by volume of an aluminium sulfate solution of 20 per cent strength and 3 parts by volume of a resin size solution of 5 per cent strength.

The effluent water is completely clear and the paper is colored fast red.

What I claim is:

1. Process for producing dyeings by means of water-soluble acyl derivatives of sparingly soluble dyestuffs which contain in the acyl radical the group lending solubility in water by treating such acyl derivatives on substrata with saponifying agents, comprising effecting the saponification with aqueous caustic alkalies which are n/10 to n-solutions in the presence of water-soluble salts which by double reaction convert the acyl derivatives into sparingly soluble salts.

2. Process for producing dyeings on cellulose by means of water-soluble acyl derivatives of sparingly soluble dyestuffs which contain in the acyl radical the group lending solubility in water by treating such acyl derivatives on cellulose with saponifying agents, comprising effecting the saponification with aqueous caustic alkalies which are n/10 to n-solutions in the presence of water-soluble salts which by double reaction convert the acyl derivatives into sparingly soluble salts.

3. Process for producing dyeings by means of water-soluble acyl derivatives of sparingly soluble dyestuffs which contain in the acyl radical the group lending solubility in water by treating such acyl derivatives on substrata with saponifying agents, comprising effecting the saponification with aqueous caustic alkalies which are n/10 to n-solutions in the presence of water-soluble salts of the alkaline earth metals.

4. Process for producing dyeings on cellulose by means of water-soluble acyl derivatives of sparingly soluble dyestuffs which contain in the acyl radical the group lending solubility in water by treating such acyl derivatives on cellulose with saponifying agents, comprising effecting the saponification with aqueous caustic alkalies which are n/10 to n-solutions in the presence of water-soluble salts of the alkaline earth metals.

5. Process for producing dyeings by means of water-soluble acyl derivatives of sparingly soluble dyestuffs which contain in the acyl radical the group lending solubility in water by treating such acyl derivatives on substrata with saponifying agents, comprising effecting the saponification with aqueous caustic alkalies which are n/10 to n-solutions in the presence of water-soluble barium salts.

6. Process for producing dyeings on cellulose by means of water-soluble acyl derivatives of sparingly soluble dyestuffs which contain in the acyl radical the group lending solubility in water by treating such acyl derivatives on cellulose with saponifying agents, comprising effecting the saponification with aqueous caustic alkalies which are n/10 to n-solutions in the presence of water-soluble barium salts.

CHARLES GRAENACHER.